United States Patent
Arenas et al.

(10) Patent No.: US 10,574,750 B2
(45) Date of Patent: Feb. 25, 2020

(54) AGGREGATION AND FEDERATION OF DISTRIBUTED SERVICE ENTITIES AND ASSOCIATIONS

(71) Applicant: MICROSOFT TECHNOLOGY LICENSING, LLC, Redmond, WA (US)

(72) Inventors: Yina Arenas, Redmond, WA (US); Dmitry Pugachev, Redmond, WA (US); Robert Howard, Bellevue, WA (US); Sriram Dhanasekaran, Redmond, WA (US); Marek Rycharski, Seattle, WA (US); Vijaya Manohararaj, Redmond, WA (US); Daniel Kershaw, Kirkland, WA (US); James Kleewein, Kirkland, WA (US); Anthony Bloesch, Redmond, WA (US); Titus Miron, Redmond, WA (US); Vikrant Arora, Redmond, WA (US); Murli Satagopan, Redmond, WA (US); Jon Rosenberg, Redmond, WA (US); Yordan Rouskov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 14/842,683

(22) Filed: Sep. 1, 2015

(65) Prior Publication Data

US 2016/0316016 A1  Oct. 27, 2016

Related U.S. Application Data

(60) Provisional application No. 62/153,432, filed on Apr. 27, 2015.

(51) Int. Cl.
*H04L 29/08* (2006.01)
*H04L 29/06* (2006.01)
*G06F 16/903* (2019.01)

(52) U.S. Cl.
CPC .... *H04L 67/1097* (2013.01); *G06F 16/90335* (2019.01); *H04L 67/16* (2013.01); *H04L 67/42* (2013.01)

(58) Field of Classification Search
CPC ...... G06F 9/54; G06F 17/3087; G06F 9/5055; G06F 17/30979; G10L 15/1815; H04L 67/1097; H04L 67/16; H04L 67/42
See application file for complete search history.

(56) References Cited

U.S. PATENT DOCUMENTS

| 2002/0035592 | A1* | 3/2002 | Wu | G06Q 10/10 709/202 |
| 2003/0135628 | A1* | 7/2003 | Fletcher | H04L 29/06 709/229 |

(Continued)

FOREIGN PATENT DOCUMENTS

| CN | 101425938 A | 5/2009 |
| CN | 103064875 A | 4/2013 |

(Continued)

OTHER PUBLICATIONS

"International Search Report and Written Opinion Issued in PCT Application No. PCT/US2016/029271", dated Aug. 19, 2016, 16 Pages.

(Continued)

*Primary Examiner* — Viet D Vu
(74) *Attorney, Agent, or Firm* — Newport IP, LLC; Michael C. Johnson

(57) ABSTRACT

Network services may include data associated with one or more entities. An aggregator service may host respective application programming interfaces (APIs) of the services at (Continued)

a single endpoint of the network such that the entities, including associations and relationships between entities, may be federated. For example, the services may register the entities of which the data of each of the services is associated with through a declarative entity model to establish an API schema for each of the services, which may be published at the aggregator service. In response to receipt of a request for entity related data from a client, the aggregator service may employ the declarative entity model to determine which of the services are associated with the entity related data such that a query may be submitted to the services, and how to aggregate responses to the query received from the services for transmission to the client.

14 Claims, 6 Drawing Sheets

(56) References Cited

U.S. PATENT DOCUMENTS

| | | | | |
|---|---|---|---|---|
| 2008/0195483 A1* | 8/2008 | Moore | | G06F 17/3089 705/14.69 |
| 2008/0301670 A1* | 12/2008 | Gouge | | G06F 17/30867 717/173 |
| 2009/0006975 A1* | 1/2009 | Salim | | G06F 17/3089 715/738 |
| 2010/0169888 A1* | 7/2010 | Hare | | G06Q 10/107 718/102 |
| 2011/0196914 A1* | 8/2011 | Tribbett | | G06F 9/541 709/203 |
| 2014/0033169 A1 | 1/2014 | Solovey et al. | | |
| 2015/0052021 A1* | 2/2015 | Elias | | G06Q 30/0627 705/26.63 |
| 2015/0331675 A1* | 11/2015 | De Magalhaes | | G06F 8/35 717/104 |

FOREIGN PATENT DOCUMENTS

| | | |
|---|---|---|
| CN | 104115465 A | 10/2014 |
| WO | 0127884 A2 | 4/2001 |
| WO | 0127884 A3 | 4/2001 |

OTHER PUBLICATIONS

"First Office Action and Search Report Issued in Chinese Patent Application No. 201680024612.1", dated Dec. 26, 2019, 16 Pages.

* cited by examiner

AGGREGATION AND FEDERATION OF DISTRIBUTED SERVICE ENTITIES AND ASSOCIATIONS

CROSS-REFERENCE TO RELATED APPLICATION

This application is a non-provisional under 35 U.S.C § 119(e) of U.S. Provisional Application No. 62/153,432 filed on Apr. 27, 2015. The U.S. Provisional application is herein incorporated by reference in its entirety.

BACKGROUND

In a collaborative environment, cloud services may be utilized to provide computation, software, data access, and storage services for users, among other utilizations. For example, the services may include a directory service, a communication service, a collaboration service, a cloud storage service, a productivity service background framework, an instant messaging service, and/or a social network service, among other examples. The services may include data associated with entities, such as users, groups, files, mail, calendar, contacts, and/or conversations, where each service may include an application programming interface (API).

In conventional network environments, the APIs of the services may not be connected and/or may be hosted at different endpoints of the network. Accordingly, in order to obtain entity related data that is associated with multiple services, a requesting client may need to submit queries to each of the services' APIs individually to obtain respective entity related data from the services, and then determine how to aggregate the obtained entity related data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to aggregation and federation of distributed service entities and associations. A request for entity related data may be received from a client, where the request may include an entity type and one or more entity properties. One or more services that include data associated with at least one of the entity type and the entity properties may be determined from a plurality of services. A query may be submitted to the one or more services to obtain the data, responses to the query received from the one or more services may be aggregated, and the aggregated responses may be transmitted to the client.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
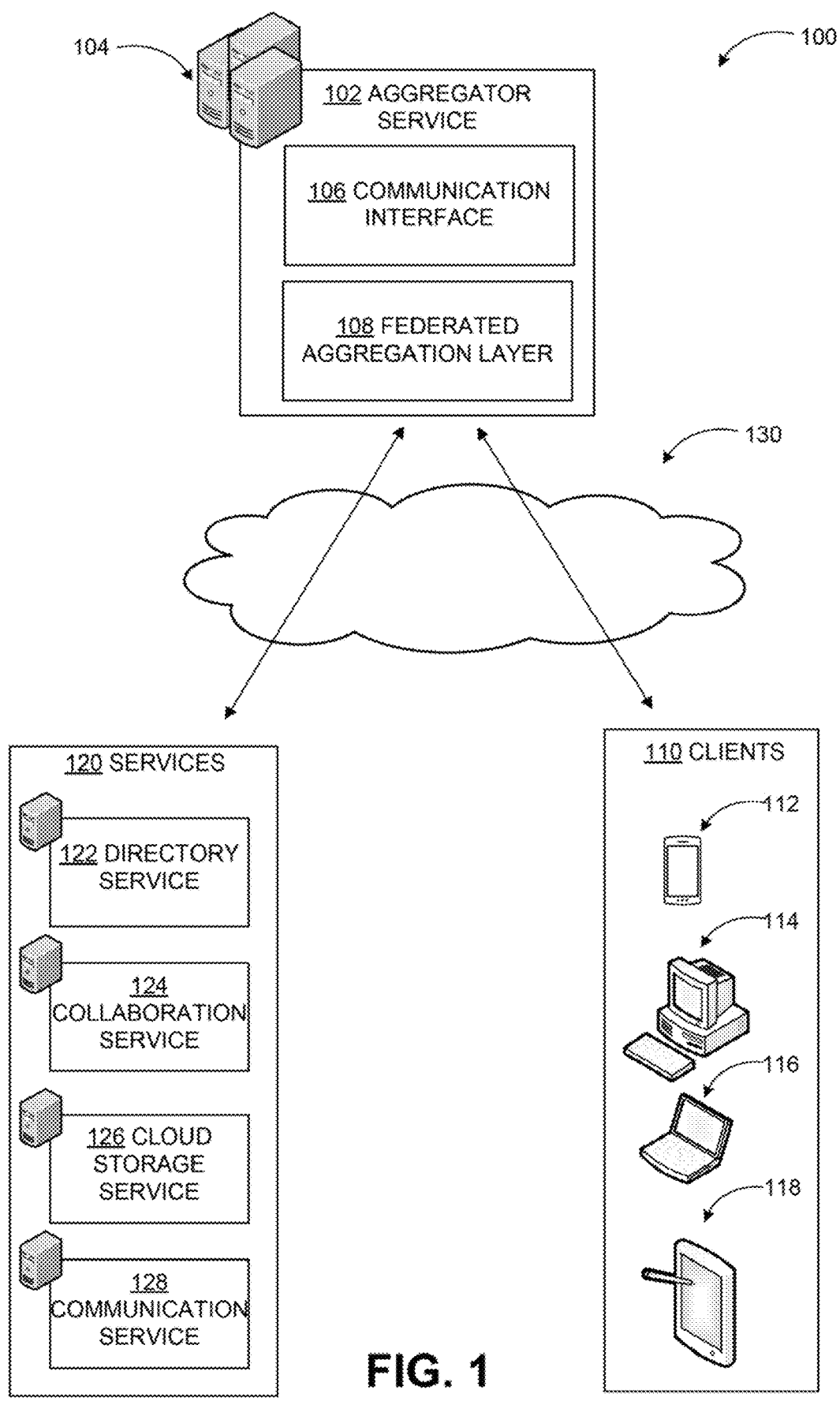
FIG. 1 includes an example network environment where distributed service entities and associations may be aggregated and federated.

As briefly described above, a plurality of services associated with a network, such as a cloud, may include data associated with entities, such as users, groups, files, mail, calendar, contacts, and/or conversations, where each service may include an application programming interface (API). An aggregator service may host respective APIs of the services at a single endpoint of the network. The services may declare and register the entities associated with each of the services using metadata documents of the respective APIs to establish an API schema for each of the services that are published to aggregator service. In response to receipt of a request for entity related data from a client, the aggregator service may parse the request against the established API schemas to determine appropriate services associated with the entity related data to submit a query to, and how to aggregate responses to the query received from the services prior to transmitting the responses back to the requesting client. Additionally, because the respective APIs of the services are hosted at the single endpoint of the network, the entities, including the associations and relationships between entities inferred from navigations between the data of the services, may be federated.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for aggregation and federation of distributed service entities and associations. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where distributed service entities and associations may be aggregated and federated. As illustrated in diagram 100, an aggregator service 102 may be hosted by one or more servers 104. At least one of the servers 104 may be a processing server operable to execute a communication interface 106 and a federated aggregation layer 108, among other components of the aggregator service 102. In some embodiments, at least another one of the servers 104 may be a storage server configured to manage one or more data stores comprising data associated with the aggregator service 102, for example. As described herein, the components of the aggregator service 102 may be implemented as software, hardware, or combinations thereof.

The communication interface 106 may facilitate communication between the aggregator service 102, a plurality of clients 110, and a plurality of services 120 over one or more networks, such as network 130. The clients 110 may include user-associated devices, such as a smart phone 112, a desktop computer 114, a laptop computer 116, a tablet computer 118, a vehicle mount computer, or a wearable computing device, among other similar devices. The services 120 may be cloud-based services of the network 130, and may include a directory service 122, a collaboration service 124, a cloud storage service 126, a communication service 128, a productivity service background framework, an instant messaging service, and/or a social network service, among other services. The services 120 may include data associated with one or more entities, such as users, groups, files, mail, calendar, contacts, and/or conversations, and each of the services may include an API.

The federated aggregation layer 108 may be configured to host APIs of the services 120 at a single endpoint of the network 130. The services 120 may register the entities which the data of the services 120 are associated with to the federated aggregation layer 108 through a declarative entity model. For example, the services 120 may declare and register the entities using metadata documents associated with respective APIs of the services 120 to establish an API schema for each of the services 120. The API schema for each of the services 120 may then be published to the federated aggregation layer 108. By employing the declarative entity model, the aggregator service 102 may support both distributed reads and distributed writes, along with add/create and delete operations. Additionally, because the respective APIs of the services are hosted at the single endpoint of the network, the federated aggregation layer 108 may be configured to federate the entities, including associations and relationships between entities inferred from navigations between the data of the services 120.

The aggregator service 102 may also include a mechanism to handle versioning of the APIs of the services 120, along with a versioning of the aggregator service 102 itself. Each of the services 120 may evolve their API schema and define API contracts independently. Each of the services 120 may include applications to specify an API-version published by the service in the request. The aggregator service 102 may expose a common public version of the API that abstracts away API contracts of the individual services 104 such that a most recent public API version may be a compilation of the most recent versions published to the aggregator service 102 by the services 120, for example.

In some embodiments, the federated aggregation layer 108 may also employ a common consent and authorization model to authenticate each of the one or more services 120 based on a single token provided by the clients 110. The token may indicate a set of one or more scopes, and an associated function with each of the scopes. If one or more of the scopes from the set are shared between the federated aggregation layer 108 and the services 120 access to a set of data from the services 120 may be authorized. The scopes may include, calendars, contacts, mail, user profile, files, directory, and all sites, where each scope may include an associated read, write, send, manage, and/or full control function. For example, if the token indicates "Directory.Read" or "Directory.ReadWrite" scopes, read and write access to data from the directory service 122, the collaboration service 124, the communication service 128 and/or and the productivity service background framework may be authorized.

In an example embodiment, the federated aggregation layer 108 may receive a request for entity related data from one of the clients 110 over the network 130 through the communication interface 106. The request may include an entity type and one or more entity properties, for example. The federated aggregation layer 108 may also receive a token from the requesting client, where the federated aggregation layer 108 may authenticate one or more of the services 120 based on the token.

In response to the receipt of the request, the federated aggregation layer 108 may employ the declarative entity model to determine appropriate services comprising the entity related data to submit a query to, and how to aggregate responses to the query received from the services 120 prior to transmitting the responses to the requesting client. For example, the federated aggregation layer 108 may determine one or more of the services 120 that include data associated with the entity type and/or the properties of the entity type by parsing the request against the established API schema for each of the services 120.

The federated aggregation layer 108 may submit a query to each of the determined services to obtain the data through the communication interface 106 over the network 130. In some examples, the federated aggregation layer 108 may generate the query to each of the determined services based on annotations of the metadata documents associated with the respective APIs of the determined services. For example, the annotations may indicate whether the respective determined service is a master service or an extendable service, where a service that includes data associated with the entity type is a master service of the entity type, and a service that includes data associated with the one or more entity properties is a service that extends the entity type. The annotations may also indicate available access, such as reads and writes, and which operations are allowed, such as add/create, update, and delete operations. In some embodiments, the query may be generated such that the query indicates the entity properties to be returned by each of the determined services in a query response. In other embodiments, the query may be generated such that the query enables each of the services to select default entity properties to be returned in the query response.

The federated aggregation layer 108 may then be configured to aggregate responses to the query received from the determined services through the communication interface 106 over the network 130. In some embodiments, the federated aggregation layer may be configured to inspect the response received from each service and transform the responses such that the response may be consistent for aggregation. The federated aggregation layer 108 may then be configured to transmit the aggregated responses to the requesting client through the communication interface 106 over the network 130.

In some embodiments, the request, queries, and query responses may be tracked across the determined services along with the aggregator service 102. For example, the requesting client may send a tracking identification along with the request, using "client-request-id" header along with the request and/or the federated aggregation layer 108 may generate the "client-request-id" header. This header may be included in each query generated/submitted by the federated aggregation layer 108 to the determined services, and may also be included in responses to the query received from the determined services.

In conventional network environments, APIs of various network services may not be connected and/or may be hosted at different endpoints of the network. Accordingly, in order to obtain entity related data that is associated with multiple services, a requesting client may need to submit queries to each of the services' APIs individually to obtain respective entity related data from the services, and then determine how to aggregate the obtained entity related data. As described in the embodiments above, the aggregator service 102 may remove the need for the requesting client to submit queries to each of the services 120 individually to obtain the data associated with the entity, which may reduce a processing load and increase a processing speed of the client, as less generation and subsequent transmission of queries are needed to obtain the requested data.

Additionally, as the requesting clients no longer have to submit queries to each of the services 120 individually, the users associated with the requesting client may no longer have to determine how to query each of the services 120 for the set of properties and/or data stored, improving usability and increasing user efficiency. Furthermore, by employing the common consent and authorization model, the aggregator service 102 may remove the need to individually authenticate each of the services 120 using separate tokens provided by the requesting client, which may further reduce processing load and increase processing speed, as one token may be provided and used to authenticate each of the services 120.

Furthermore, the aggregator service 102 may determine how to aggregate the data returned in the responses from the services such that powerful navigations may be enabled, further improving usability for the user associated with the requesting client as they no longer need to determine how to aggregate the data obtained in response to each individual query submitted. For example, the aggregator service 102 may be configured to reference one or more files in a collaboration service that have been shared between two users, navigate to the most recently modified file, determine which user last modified the file, and then determine a manager of the user.

Embodiments, as described herein, address a need that arises from very large scale of operations created by networked computing and cloud based services that cannot be managed by humans. The actions/operations described herein are not a mere use of a computer, but address results of a system that is a direct consequence of software used as a service such as the aggregator service 102 offered in conjunction with large numbers of users, clients, and services.

Figure 2:
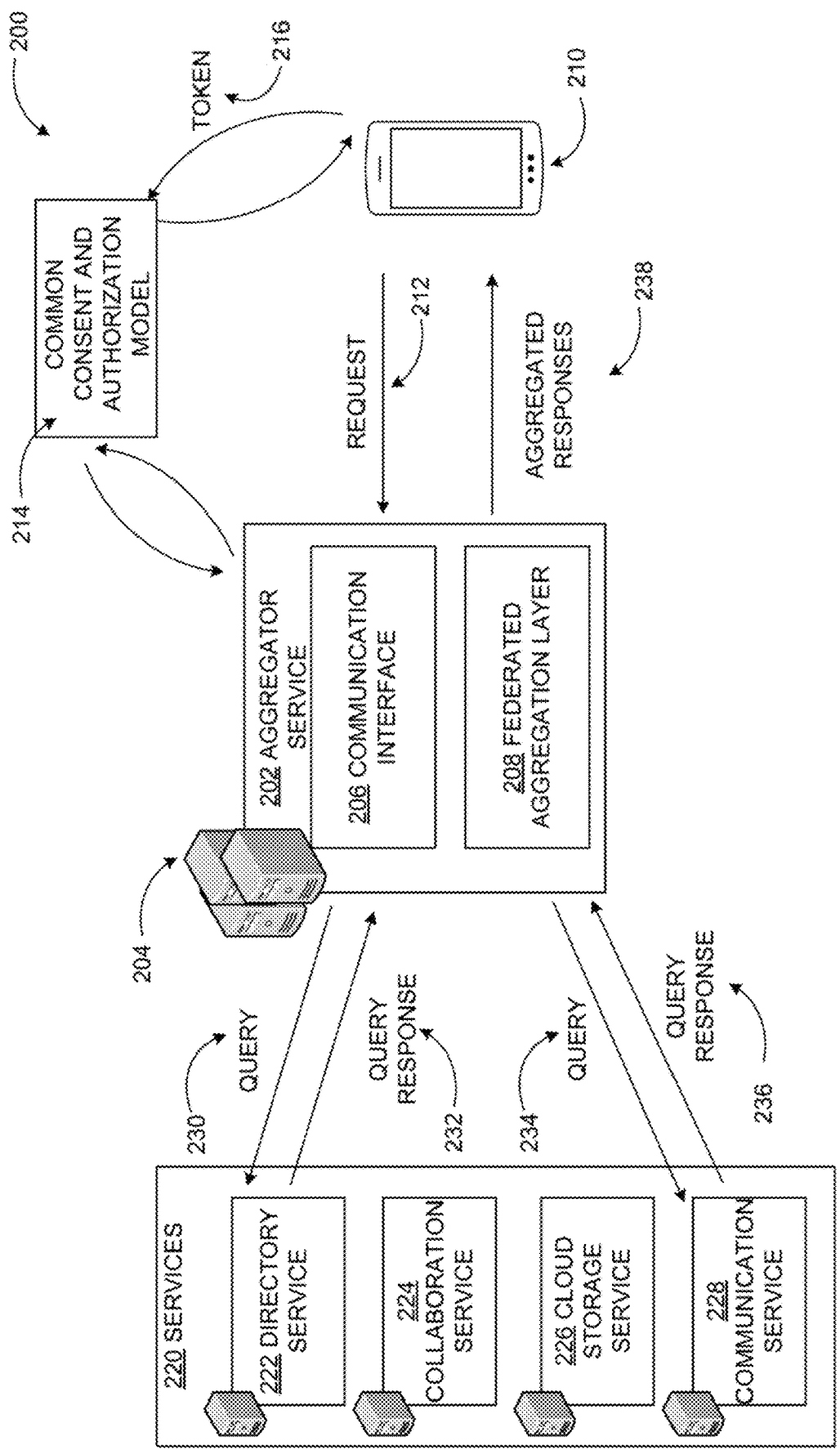
FIG. 2 illustrates an example system to aggregate and federate distributed service entities and associations.

FIG. 2 illustrates an example system to aggregate and federate distributed service entities and associations. As illustrated in diagram 200, an aggregator service 202 may be hosted by one or more servers 204. At least one of the servers 204 may be a processing server operable to execute a communication interface 206 and a federated aggregation layer 208, among other components of the aggregator service 202.

The communication interface 206 may facilitate communication between the aggregator service 202, a plurality of clients, such as client 210, and a plurality of services 220 over a network. The services 220 may be cloud-based services of the network, and may include a directory service 222, a collaboration service 224, a cloud storage service 226, a communication service 228, a productivity service background framework, an instant messaging service, and/or a social network service, among other examples. The services 220 may include data associated with one or more entities, and each of the services 220 may include an API.

The federated aggregation layer 208 may be configured to host the APIs for the services 220 at a single endpoint of the network. The services 220 may register the entities of which the data of the services 220 is associated with to the federated aggregation layer 208 through a declarative entity model. For example, the services 220 may declare and register the entities using metadata documents associated with respective APIs of the services 220 to establish an API schema for each of the services 220. The API schema for each of the services 220 may then be published to the federated aggregation layer 208. In response to receipt of a request for entity related data from the client 210, the federated aggregation layer 208 may employ the declarative entity model to determine which of the services 220 are associated with the entity related data such that one or more queries (e.g., 230 and 234) may be submitted to those services, and how to aggregate responses to the query (e.g., 232 and 236) received from the services for transmission to the client 210.

The declarative entity model may be defined as a set of entity types and association types and/or navigation properties. Entity types may include users, groups, files, mail, calendar, contacts, and/or conversations, for example. Each entity type may be mastered by a service. For example, an entity type, E, may be mastered by a service A. The service that masters the entity type may be able to accept POST/DELETE requests. Accordingly, upon receiving a client request associated with the entity type, E, the federated aggregation layer 208 may submit a query with the POST/DELETE request to an end point of the service, A, that masters the entity type, E.

In some examples, an entity type may contain properties and associations mastered by services other than the master service. For example, the entity type E may be mastered by service A, and may be extended by Service B when Service B publishes an API schema that declares a set of properties it masters on entity E. In some examples, one service may master a given property of a given entity type. Accordingly, upon receiving a client request that contains entity properties mastered by services other than the entity type master, the federated aggregation layer 208 may submit a query to the end point of the service that masters the respective entity type, as well as to end points of the other services that master the respective properties to write an extended set of properties. The other services that extend the entity may be responsible for managing the respective properties they master, however these services may not support POST/DELETE requests for that entity type.

Additionally, because the respective APIs of the services are hosted at the single endpoint of the network, the federated aggregation layer 208 may be configured to federate the entities, including associations and relationships between entities inferred from navigations between the data of the services 220. For example, a navigation property in the declarative entity model may support navigation from an entity type mastered by one service to an entity type mastered by a same or another service. Navigation property definitions may include name, source, and target entity types. A service that masters the navigation property may or may not master the source and/or the target entity types. For example, the navigation property may be mastered by service A, where an entity specified as the source is mastered by service B and an entity specified as the target is mastered by service C.

In a first example, "manager" may be a navigation property mastered by the directory service 222, where "users" entity type is a source and a target of the relationship. The "users" entity type may also be mastered by the directory service 222. Accordingly, the navigation property with its source and target entities may be mastered by the directory service 222. In a second example, "favorite Groups" may be a navigation property mastered by the communication service 228. "Users" entity type may be a source and "groups" entity type may be a target, where both the source and target may be mastered by the directory service 222. In some embodiments, if a service masters a navigation property that describes a relationship between a first entity and a second entity, then the same service may master a navigation property that describes the reverse relationship of the second entity and the first entity. However, this may not always be true. For example, the communication service 228 may not declare a navigation property on "groups" entity type to describe users who favored a given group (the reverse relationship to favoriteGroups). Thus, the navigation property may be explicitly defined in all cases. For example, "directReports" may be a navigation property that describes a reverse relationship of a manager and manager's direct reports, which is explicitly defined in the entity model.

The federated aggregation layer 208 may be associated with a canonical identifier to match partial entity representation in order to be able to merge the results for extended entity types as well as to locate entities that represent a source and target of a given navigation property. The identifier may be consistent across the services. For entity types that may declare a compound key as an identifier, the services 220 may provide an alternate key to the aggregator service 202 for a "key-as-segment" representation. For example, for a files API associated with the collaboration service 224, the identifier may be a tuple of {<container Guid>, <full file path>}. The identifier may be represented as a concatenated value translated to ensure a safe uniform resource locator (URL) representation with positions of special characters encoded in a value of the identifier itself. The URL may be specific to an API of the aggregator service 202, where a namespace segment in the URL may correspond to a tenancy of the service. In some examples, the namespace may also be customized.

Returning to the diagram 200, in an example scenario, the federated aggregation layer 208 may receive a request 212 for entity related data from a client 210 through the communication interface 206. The request 212 may include an entity type and one or more entity properties. For example, the request may indicate a "users" entity type. In response to the receipt of the request, the federated aggregation layer 208 may employ the declarative entity model to determine which of the services 220 comprise the entity related data to submit queries to, and how to aggregate responses to the queries received from the services 220 prior to transmitting the responses to the client 210. For example, the federated aggregation layer 208 may determine one or more of the services 220 that include data associated with the "users" entity type by parsing the request 212 against the established API schema for each of the services. For example, the federated aggregation layer 208 may determine that the directory service 222 and the communication service 228 includes data associated with the "users" entity type. The directory service 222, may be a master of the "users" entity type, and the communication service 228 may extend the "users" entity type by managing one or more entity properties of the "users" entity type that are included within the request 212, for example.

In some embodiments, the federated aggregation layer 208 may also employ a common consent and authorization model 214 to authenticate each of the one or more services 220 based on a single token 216 provided by the client 210 along with the request 212. The token may indicate a set of scopes, and an associated function for each scope, where shared scopes between the federated aggregation layer 208 and the services 220 may authorize access to a set of data. The scopes may include, calendars, contacts, mail, user profile, tiles, directory, and all sites, and each scope may include an associated read, write, send, manage, and/or full control function, for example. In one embodiment, a set of globally unique shared scopes may be defined to form a logical partition of data for the federated aggregation layer 208 and the services 220, where the workloads of the services 220 understand a sub set of these shared scopes based on a type of data the services 220 expose. For example, the communication service 228 may understand the calendar, contacts, mail, and user profile scopes. When the client 210 grants access to a particular scope through provision of the token 216 indicating the particular scope, it translates to the client 210 granting access for any of the services 220 which exposes its data under that particular scope. In other words, the client 210 has consented for access to that logical partition of data irrespective of where it comes from. For example, if the client 210 grants access to "Mail.Read", "Mail.Write", and "Mail.Send" scopes, the client is granting access for the communication service 228 and/or and a productivity service background framework.

The federated aggregation layer 208 may submit queries 230 and 234 to the directory service 222 and the communication service 228, respectively to obtain the "users" entity type related data through the communication interface 206. In some examples, the federated aggregation layer 108 may generate the queries 230 and 234 based on annotations in the metadata documents associated with the respective APIs of the directory service 222 and the communication service 228. For example, the annotations may indicate that the directory service 222 and the communication service 228 are a master service and an extendable service, respectively, an available access to data for each, such as reads and writes, and which operations are allowed for each, such as add/create, update, and delete operations.

In some embodiments, the queries 230 and 234 may be tracked across the directory service 222 and the communication service 228 along with the aggregator service 202. For example, the client 210 may send a tracking identification along with the request 212, using "client-request-id" header along with the request. If the client 210 does not include the tracking identification with the request, the federated aggregation layer 208 may generate the "client-request-id" header. This header may be a part of each of the queries 230 and 234 generated and submitted by the federated aggregation layer 208 to the directory service 222 and the communication service 228, respectively, and may also be included in query responses 232 and 236 from the directory service 222 and the communication service 228, respectively.

The federated aggregation layer 208 may be configured to aggregate the query responses 232 and 236 received from the directory service 222 and the communication service 228, respectively, through the communication interface 206. In some embodiments, the federated aggregation layer 208 may be configured to inspect the query responses 232 and 236 and transform the query responses 232 and 236 such that they may be consistent for aggregation for example. The federated aggregation layer 208 may then be configured to transmit the aggregated responses 238 to the requesting client 210 through the communication interface 206. Any consistency and/or errors may be reported to the client 210 along with the aggregated responses 238.

Figure 3:
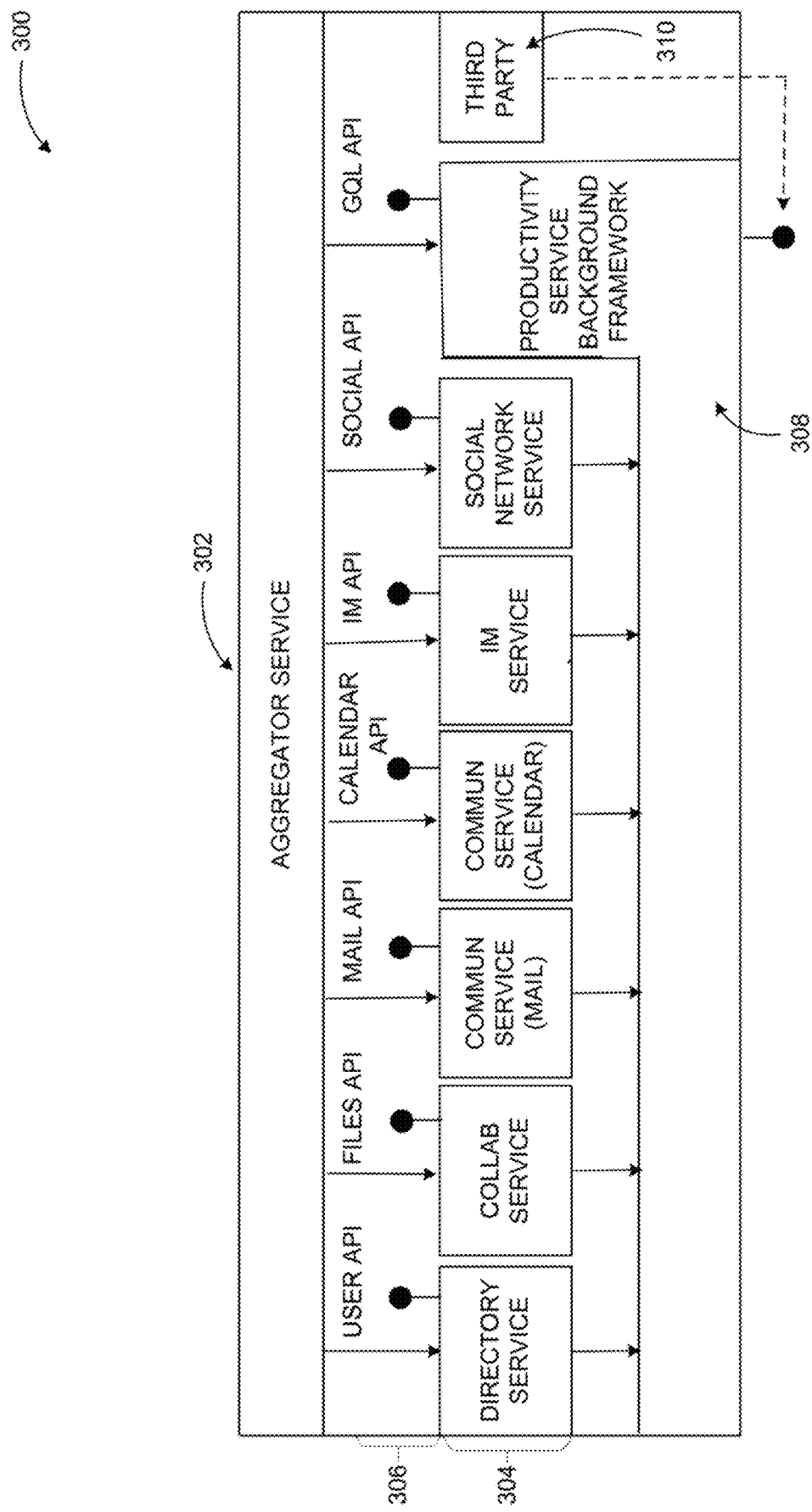
FIG. 3 includes a conceptual diagram illustrating interactions between an aggregator service and one or more other services to aggregate and federate distributed service entities and associations.

FIG. 3 includes a conceptual diagram illustrating interactions between an aggregator service and one or more other services to aggregate and federate distributed service entities and associations.

As shown in a diagram 300, various services 304 of a network may each include an application programming interface (API) 306. The services 304 may be cloud-based services, and may include a directory service, a communication service, a collaboration service, a cloud storage service, an instant messaging service, and/or a social network service, among other examples. The services 304 may also include a productivity service background framework 308, which each of the other services may be associated with. For example, the productivity service background framework 308 may be registered under a tenant of the services 304 as any other first party service. The services 304 may include data associated with entities, such as users, groups, files, mail, calendar, contacts, and/or conversations. The aggregator service 302 may host the APIs 306 at a single endpoint of the network, and the services 304 may register the entities of which the data of each of the services 304 is associated with to the aggregator service 302 through a declarative entity model. For example, the services 304 may declare and register the entities using metadata documents associated with respective APIs of the services 304 to establish an API schema for each of the services 304 that may be published to the aggregator service 302. As such, the entities, including the associations and relationships between entities inferred from navigations between the data and/or determined by the productivity service background framework 308, may be federated and presented as a connected graph of entities.

In an example embodiment, the aggregator service 302, comprising a communication interface and a federated aggregation layer, among other components, may be configured to aggregate and federate entities whose properties and/or data is stored in the services 304. For example, properties associated with the "conversations" entity may be primarily stored in the communication service, and thus the communication service may be a master of the "conversations" entity. Additional services, such as the instant messenger application, and the social network application, may also include some properties about a given conversation. As such, these additional services may extend the "conversations" entity by managing the other properties.

In response to a request for a given conversation from a client, the aggregator service 302 may be configured to determine which of the services 304 have data associated with the "conversations" entity type and/or one or more "conversations" entity properties, such as the communication service, the instant messenger application, and the social network application, as described in the example above. The aggregator service 302 may submit a query to the communication service, the instant messenger application, and the social network application service to obtain the data associated with the "conversations" entity type and/or "conversations" entity properties. In some examples, the aggregator service 302 may generate the query to specify the "conversations" entity properties that are to be returned in a response to the query. In other examples, the aggregator service 302 may not specify any properties to be returned in the response, and the services may be enabled to select a default set of properties to return in the response to the query. The aggregator service 302 may then aggregate the data returned in the responses, and transmit the aggregated data to the requesting client.

To enable the above-described high level interactions between the aggregator service 302 and the services 304, the services 304 may need compatible endpoints. For the endpoints to be compatible, the following features for the services may be established: the services 304 may host compatible content types, accept a global request structure, support canonical identifications for all entity types, provide consistent error semantics and request tracking/correlation, and support a common consent and authorization model, as described in the following paragraphs.

Each of the services 304 may support an 'application/atom+xml" content type along with variations such as 'minimalmetdata' and 'verbose' to enable the aggregator service 302 to have a consistent content type when aggregating responses. If the client requests an 'applicationatom+xml' content type, the aggregator service 302 may complete the necessary conversion to the 'application/json' content type.

In regards to accepting a global request structure, query responses from the services 304 with verbose metadata of an entity may contain identification properties that represent a unique addressable URL of the entity. To accommodate one or more of the services 304 that may not confirm to the addressing scheme, the identification property may be rewritten in the aggregator service 302. In one example, the aggregator service 302 may retrieve a key property from the API schema of the one or more services 304 and generate the identification property using the key property. In another example, the aggregator service 302 may include the public endpoint name as a header that instructs the services 304 to generate the identification property based on respective API schema known by the services 304.

Additionally, the request and subsequent queries may be tracked across the services 304 along with the aggregator service 302 using a "client-request-id" header in the request, queries, and query responses, alike. A canonical identifier that is consistent across the services 304 may be supported to match partial entity representation in order to be able to merge the results for extended entity types as well as to locate entities that represent a source and target of a given navigation property, as discussed in detail in conjunction with FIG. 2.

Furthermore, the services 304 may support a common consent and authorization model employed by the aggregator service 302. The common consent and authorization model may authenticate the services 304 based on a single token provided by the client along with the request. The token may indicate a set of scopes and functions associated with each of the scopes. If one or more scopes of the set are shared between the aggregator service 302 and the services 304 access to a set of data of the services 304 may be authorized. The scopes may include, calendars, contacts, mail, user profile, files, directory, and all sites, where each scope may include an associated read, write, send, mange, and/or full control function, for example. In one embodiment, a set of globally unique shared scopes may be defined to form a logical partition of data for the services 304, where the workloads of the services 304 understand a subset of these shared scopes based on a type of data the services 304 expose. In some examples, the productivity service background framework 308 may be registered under a tenant of the services as any other first party service, where the productivity service background framework 308 may expose a set of scopes that correspond to each of the supported entities.

In an example consent and authorization process, a third party application 310, may request permissions for a set of scopes using a list on a scope query parameter. Following a user consent, a consent grant may be recorded for the third party application 310 based on the scopes requested. For example, for a globally unique shared scope, the consent grant may be recorded on that scope for any resource that supports it as [Application, Productivity Service Background Framework, Scope, User], where a resource field is ignored and the productivity service background framework acts as wildcard to replace the resource field. For other scopes, the consent grant may be recorded for the application based on resources that support the scope as [Application, Resource, Scope, User]. If no resource is specified by the token, the productivity service background framework 308 may be implied as the resource and the following scopes are added to the token: consent grants recorded for the application for the requested resource, consent grants recorded for the application for shared scopes, (for example, resource="*"), and consent grants recorded for shared scopes irrespective of the resource (where these consent grants may be updated to set the resource as "*") to enable back compatibility for existing applications.

The examples provided in FIGS. 1 through 3 are illustrated with specific services, devices, components, and configurations. Embodiments are not limited to environments according to these examples. Aggregation and federation of distributed service entities and associations may be implemented in environments employing fewer or additional services, devices, components, and configuration. For example, services and applications described herein may be implemented in cloud scenarios, where some or all mailboxes may be hosted in the cloud and others may be hosted on-premise. Furthermore, the example services, devices, components, and configuration shown in FIG. 1 through 3 may be implemented in a similar manner with other values using the principles described herein.

Figure 4:
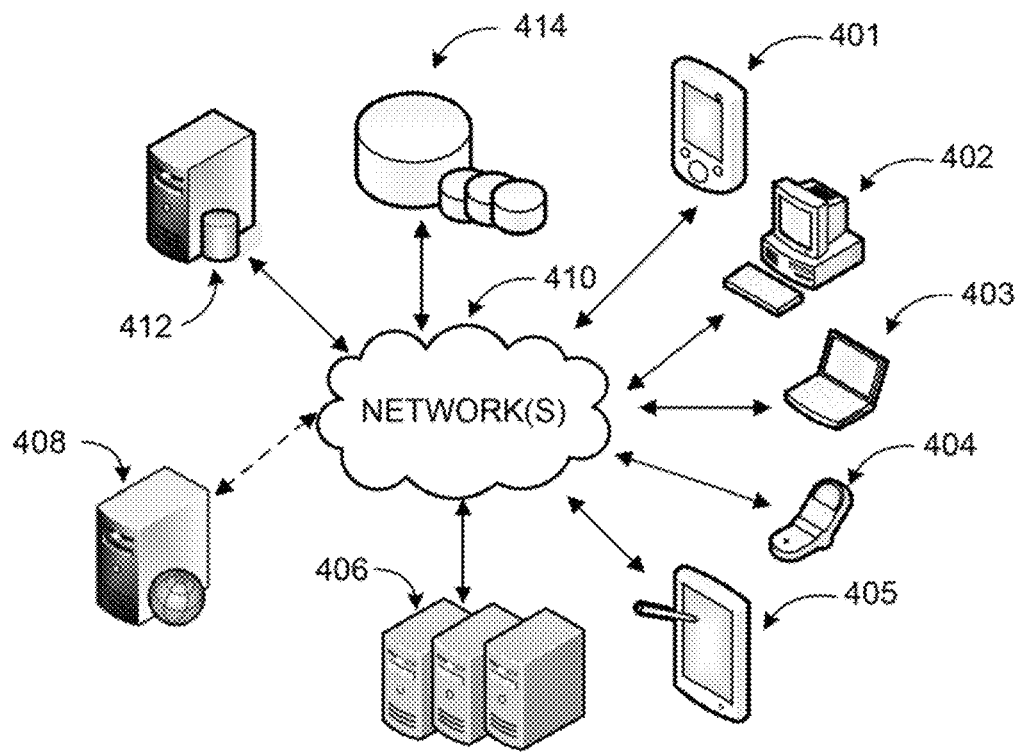
FIG. 4 is a networked environment, where a system according to embodiments may be implemented.

FIG. 4 is a networked environment, where a system according to embodiments may be implemented. An aggregator service configured to aggregate and federate distributed service entities and associations may be implemented via software executed over one or more servers 406 such as a hosted application. The platform may communicate with client applications on individual computing devices such as, a personal digital assistant (PDA) 401, a desktop computer 402, a laptop computer 403, a smart phone 404, or a tablet 405 ('client devices') through network(s) 410.

Client devices 401-405 are used to access the functionality provided by the hosted service or application. The aggregator service may be configured to receive a client request for entity related data that includes an entity type and one or more entity properties. The aggregator service may be configured to determine one or more services from a plurality of services that include data associated with the entity type and/or the one or more entity properties, and submit a query to the determined services to obtain the data. The aggregator service may then be configured to aggregate responses to the query received from the services, and transmit the aggregated responses to the client. The aggregator service may store data associated with the entity related data in data store(s) 414 directly or through database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be aggregate and federate service entities and associations. Furthermore, the networked environments discussed in FIG. 4 are for illustration purposes only. Embodiments are not limited to the example applications, modules, or processes.

Figure 5:
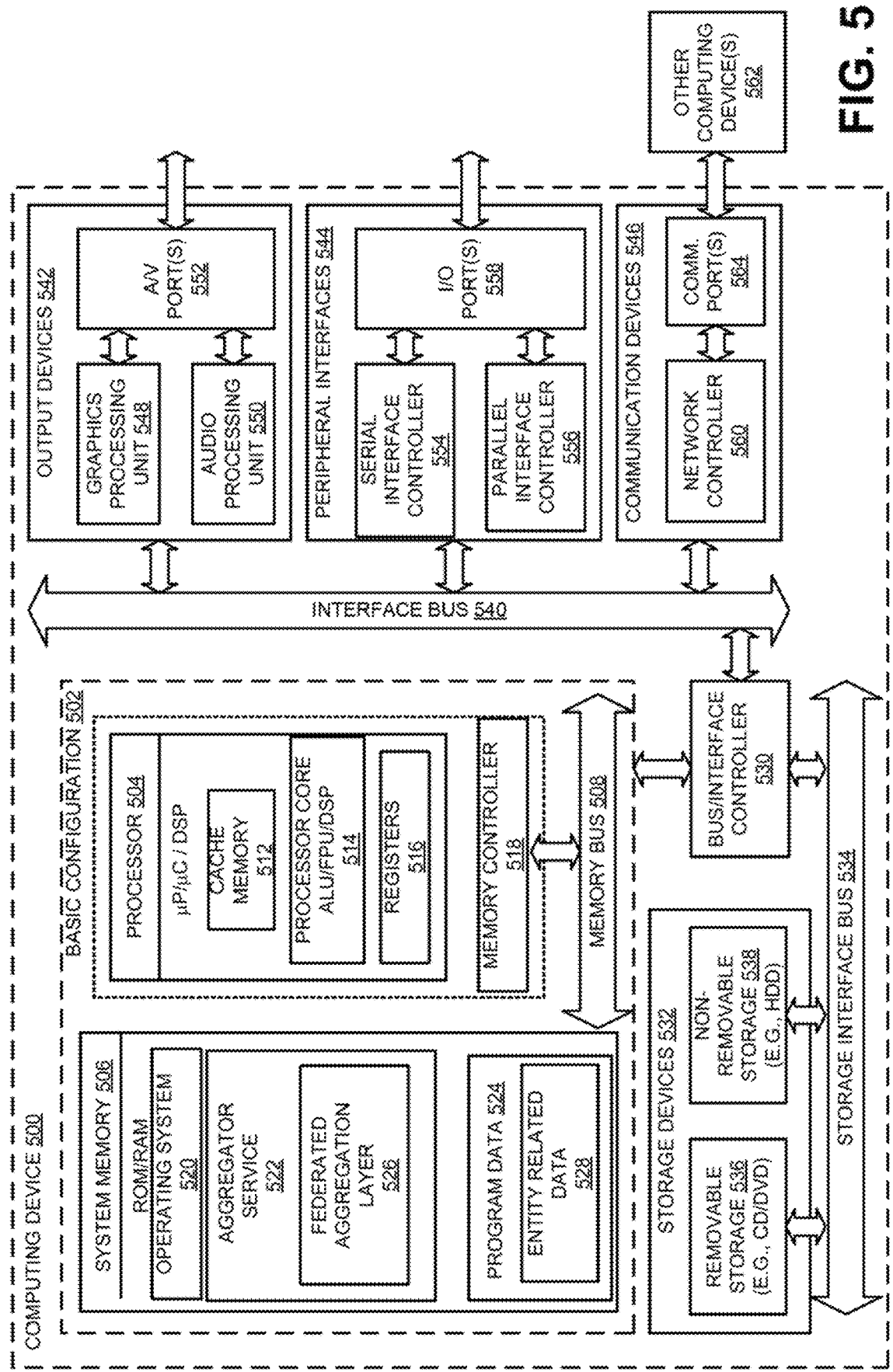
FIG. 5 is a block diagram of an example general purpose computing device, which may be used to aggregate and federate distributed service entities and associations.

FIG. 5 and the associated discussion are intended to provide a brief, general description of a general purpose computing device, which may be used to aggregate and federate distributed service entities and associations.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an aggregator service 522, and program data 524. The aggregator service 522 may include a federated aggregation layer 526, which may be integrated component of the aggregator service 522 or an independent component. The federated aggregation layer 526 of the aggregator service 522 may be configured to receive a client request for entity related data that includes an entity type and one or more entity properties, determine one or more services that include data associated with the entity type and/or the one or more entity properties, and submit a query to the services to obtain the data. The federated aggregation layer 526 of the aggregator service 522 may then be configured to aggregate responses to the query received from the services, and transmit the aggregated responses to the client, as described herein. The program data 524 may include, among other data, entity related data 528, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to aggregate and federate distributed service entities and associations. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
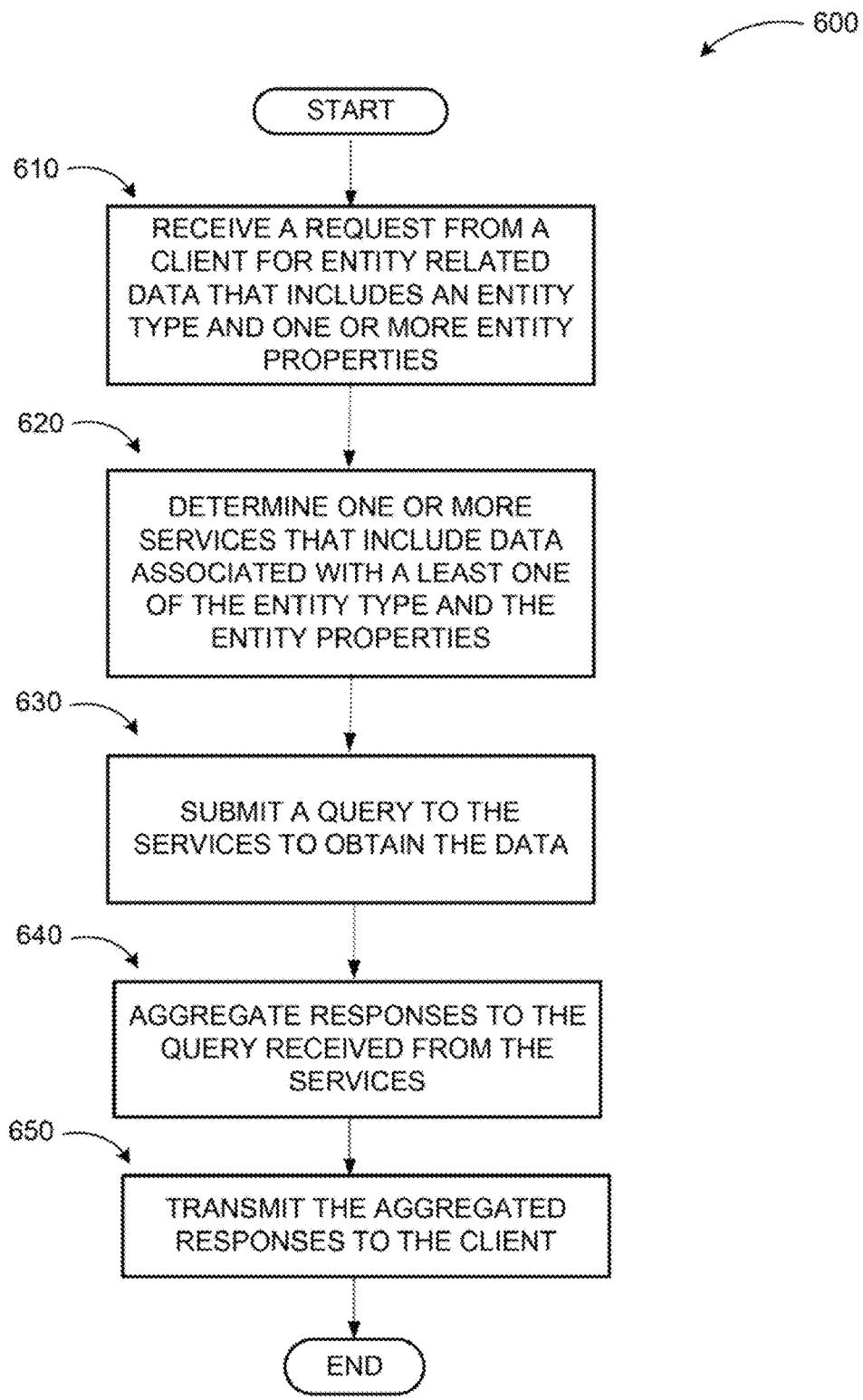
FIG. 6 illustrates a logic flow diagram of a method to aggregate and federate distributed service entities and associations, according to embodiments.

FIG. 6 illustrates a logic flow diagram for process 600 of a method to aggregate and federate distributed service entities and associations, according to embodiments. Process 600 may be implemented on a server or other system. An example system may include a network comprising a plurality of services that include data associated with one or more entities, and an aggregator service hosting respective APIs of the services at a single network endpoint. The services may register the entities of which the data of each of the services is associated with to the aggregator service through a declarative entity model. For example, the services may register the entities using metadata documents associated with respective APIs of the services to establish an API schema for each of the services that is published to the aggregator service.

Process 600 begins with operation 610, where a federated aggregation layer of the aggregator service may be configured to receive a client request for entity related data through a communication interface of the aggregator service. The request may include an entity type and one or more entity properties. Entity types may include users, groups, files, mail, calendar, contacts, and/or conversations, for example.

At operation 620, the federated aggregation layer may be configured to determine one or more services of the plurality of services that include data associated with the entity type and/or the entity properties. For example, the federated aggregation layer may parse the request against the API schema of each of the plurality of services to determine the services that include data associated with the entity type and/or the entity properties within the request.

At operation 630, the federated aggregation layer may submit a query to the services determined to include data associated with the entity type and/or the entity properties through the communication interface to obtain the entity related data. The query may be generated based on annotations within the metadata documents associated with the respective APIs of each of the services. In some embodiments, the query may indicate the properties of the entity type to be returned by each of the services in a query response. In other embodiments, the query may enable each of the services to select default entity properties to be returned in the response.

At operation 640, the federated aggregation layer may be configured to aggregate responses to the query received from the services through the communication interface. In some examples, the federated aggregation layer may be configured to inspect and transform the response received from each service such that the responses may be consistent for aggregation. At operation 650, the federated aggregation layer may transmit the aggregated responses to the client through the communication interface.

The operations included in process 600 are for illustration purposes. Aggregation and federation of distributed service entities and association may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, computing devices configured to aggregate and federate distributed service entities and associations are described. An example computing device may include a memory configured to store instructions, and a processor coupled to the memory, and configured to execute an aggregator service. The aggregator service may include a communication interface configured to facilitate communication between the aggregator service, a plurality of clients, and a plurality of services, where each of the services includes data associated with one or more entities. The aggregator service may also include a federated aggregation layer configured to receive a request from a client for entity related data, where the request includes an entity type and one or more entity properties, and determine one or more services from the services that include data associated with the entity type and/or the entity properties. The federated aggregation layer may also be configured to submit a query to the one or more services to obtain the data, aggregate responses to the query received from the services; and transmit the aggregated responses to the client.

In further examples, the federated aggregation layer may be further configured to host APIs of the services at a single network endpoint, where the entities of which the data of each of the services is associated with are registered to the single network endpoint through a declarative entity model to establish an API schema for each of the services. The federated aggregation layer may be further configured to employ the declarative entity model to determine the one or more services from the services that include data associated with the entity type and/or the entity properties by parsing the request against the established API schema for each of the services. The federated aggregation layer may be further configured to employ a mechanism to handle versioning of APIs of the services and an API of the aggregator service, where a common public version of the API of the aggregator service may be a compilation of most recent versions of the APIs of the services published to the aggregator service.

In further examples, the federated aggregation layer may be further configured to employ a common consent and authorization model to authenticate each of the services based on a token provided by the client, where the token indicates a set of one or more scopes, and an associated function with each of the scopes. The services may include a directory service, a communication service, a collaboration service, a cloud storage service, a productivity service background framework, an instant messaging service, and/or a social network service. The entity type may include users, groups, files, emails, calendars, contacts, and/or conversations.

According to some embodiments, methods to aggregate and federate distributed service entities and associations are described. An example method may include receiving a request from a client for entity related data, where the request includes an entity type and one or more entity properties, and determining one or more services from a plurality of services that include data associated with the entity type and/or the entity properties. The example method may also include submitting a query to the services to obtain the data, aggregating responses to the query received from the services, and transmitting the aggregated responses to the client.

In other embodiments, one or more entities of which data of each of the services is associated with may be enabled to be registered to a single network endpoint using a metadata document associated with respective APIs of the services to establish an API schema for each of the services. Determining the one or more services that include data associated with the entity type and/or the entity properties may further include parsing the request against the API schema established for each of the services.

In further embodiments, the query for each of the services may be generated based on annotations of the metadata document associated with the respective APIs of each of the services. The query may be generated such that the query indicates the entity properties are to be returned in the response to the query. The query may be generated such that the services are enabled to return a default set of entity properties in the response to the query. Aggregating the responses to the query received from the services includes inspecting the responses to the query upon receipt, and transforming the responses to the query based on the inspection such that the responses to the query are consistent for aggregation.

According to some examples, computer-readable memory devices with instructions stored thereon to aggregate and federate distributed service entities and associations are described. Example instructions may include receiving a request from a client for entity related data, where the request includes an entity type and one or more entity properties, and determining one or more services from a plurality of services that include data associated with the entity type and/or the entity properties by employing a declarative entity model to parse the request against API schema established for each of the services. The example instructions may also include submitting a query to the services to obtain the data, aggregating responses to the query received from the services, and transmitting the aggregated responses to the client.

In other examples, a service determined to include data associated with the entity type may be a master service of the entity type, and a service determined to that include data associated with the one or more entity properties may be a service that extends the entity type. The request may include a tracking identification in a header of the request that is persisted in a header of the query and a header of the responses to the query.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device configured to aggregate and federate distributed service entities and associations, the computing device comprising:
   a memory configured to store instructions;
   a processor coupled to the memory, and configured to execute an aggregator service, the aggregator service comprising:
      a communication interface configured to facilitate communication between the aggregator service, a plurality of clients, and a plurality of services, wherein each of the plurality of services are associated with one or more entities; and
      a federated aggregation layer configured to:
         host application programming interfaces (APIs) of the plurality of services at a single network endpoint, wherein each of the plurality of services register the respective one or more associated entities to the single network endpoint through a declarative entity model using a metadata document associated with the respective APIs of the plurality of services;
         employ a mechanism to handle versioning of the APIs of the plurality of services and an API of the aggregator service, wherein a common public version of the API of the aggregator service is a compilation of most recent versions of the APIs of the plurality of services published to the aggregator service;
         receive a request from a client for entity related data, wherein the request includes an entity type and one or more entity properties, and wherein the entity type includes a user, a group, a file, a mail, a calendar, a contact, or a conversation;
         determine one or more services from the plurality of services that include data associated with at least one of the entity type and the one or more entity properties by employing the declarative entity model;
         submit a query to the one or more services to obtain the data, wherein the query is generated for each of the one or more services based on annotations of the metadata document associated with the respective APIs of each of the one or more services, and wherein the annotations indicate available access to the data including distributed reads, distributed writes, and allowed operations, including add, create, update, and delete operations;
         aggregate responses to the query received from the one or more services; and
         transmit the aggregated responses to the client.

2. The computing device of claim 1, wherein each of the plurality of services register the respective one or more associated entities to the single network endpoint through the declarative entity model to establish an API schema for each of the plurality of services.

3. The computing device of claim 2, wherein the federated aggregation layer is further configured to determine the one or more services from the plurality of services that include data associated with at least one of the entity type and the one or more entity properties by employing the declarative entity model to parse the request against the established API schema for each of the plurality of services.

4. The computing device of claim 1, wherein the federated aggregation layer is further configured to employ a common consent and authorization model to authenticate each of the plurality of services based on a token provided by the client.

5. The computing device of claim 4, wherein the token indicates a set of one or more scopes, and an associated function with each of the one or more scopes.

6. The computing device of claim 1, wherein the plurality of services include a directory service, a communication service, a collaboration service, a cloud storage service, a productivity service background framework, an instant messaging service, and a social network service.

7. A method to aggregate and federate distributed service entities and associations, the method comprising:
   hosting application programming interfaces (APIs) of a plurality of services at a single network endpoint, wherein the plurality of services are associated with one or more entities, and wherein each of the plurality of services register the respective one or more associated entities to the single network endpoint through a declarative entity model using a metadata document associated with the respective APIs of the plurality of services;
   employing a mechanism to handle versioning of the APIs of the plurality of services and an API of the aggregator service, wherein a common public version of the API of the aggregator service is a compilation of most recent versions of the APIs of the plurality of services published to the aggregator service;
   receiving a request from a client for entity related data, wherein the request includes an entity type and one or more entity properties, and wherein the entity type includes a user, a group, a file, a mail, a calendar, a contact, or a conversation;

determining one or more services from the plurality of services that include data associated with at least one of the entity type and the one or more entity properties by employing the declarative entity model;

submitting a query to the one or more services to obtain the data, wherein the query is generated for each of the one or more services based on annotations of the metadata document associated with the respective APIs of each of the one or more services, and wherein the annotations indicate available access to the data including distributed reads, distributed writes, and allowed operations, including add, create, update, and delete operations;

aggregating responses to the query received from the one or more services; and transmitting the aggregated responses to the client.

8. The method of claim 7, wherein determining the one or more services from the plurality of services that include data associated with the at least one of the entity type and the one or more entity properties by employing the declarative model further comprises:

parsing the request against the API schema established for each of the plurality of services.

9. The method of claim 7, further comprising:

generating the query such that the query indicates the one or more entity properties are to be returned in the response to the query.

10. The method of claim 7, further comprising:

generating the query such that the one or more services are enabled to return a default set of entity properties in the response to the query.

11. The method of claim 7, wherein aggregating the responses to the query received from the one or more services comprises:

inspecting the responses to the query upon receipt; and
transforming the responses to the query based on the inspection such that the responses to the query are consistent for aggregation.

12. A computer-readable memory device with instructions stored thereon to aggregate and federate distributed service entities and associations, the instructions comprising:

hosting application programming interfaces (APIs) of a plurality of services at a single network endpoint, wherein the plurality of services are associated with one or more entities, and wherein each of the plurality of services register the respective one or more associated entities to the single network endpoint through a declarative entity model using a metadata document associated with the respective APIs of the plurality of services;

employing a mechanism to handle versioning of the APIs of the plurality of services and an API of the aggregator service, wherein a common public version of the API of the aggregator service is a compilation of most recent versions of the APIs of the plurality of services published to the aggregator service;

receiving a request from a client for entity related data, wherein the request includes an entity type and one or more entity properties, and wherein the entity type includes a user, a group, a file, a mail, a calendar, a contact, or a conversation;

determining one or more services from the plurality of services that include data associated with at least one of the entity type and the one or more entity properties by employing the declarative entity model to parse the request against API schema established for each of the plurality of services;

submitting a query to the one or more services to obtain the data, wherein the query is generated for each of the one or more services based on annotations of the metadata document associated with the respective APIs of each of the one or more services, and wherein the annotations indicate available access to the data including distributed reads, distributed writes, and allowed operations, including add, create, update, and delete operations;

aggregating responses to the query received from the one or more services; and transmitting the aggregated responses to the client.

13. The computer-readable memory device of claim 12, wherein a service determined to include data associated with the entity type is a master service of the entity type, and a service determined to include data associated with the one or more entity properties is a service that extends the entity type.

14. The computer-readable memory device of claim 12, wherein the request includes a tracking identification in a header of the request that is persisted in a header of the query and a header of the responses to the query.

* * * * *